US012808743B2

(12) United States Patent
Farkas et al.

(10) Patent No.: US 12,808,743 B2
(45) Date of Patent: Nov. 24, 2026

(54) SECURE OPTICAL LEAK SENSING

(71) Applicant: DELL PRODUCTS L.P., Round Rock, TX (US)

(72) Inventors: Sandor Farkas, Round Rock, TX (US); Michael Stumpf, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 251 days.

(21) Appl. No.: 18/819,378

(22) Filed: Aug. 29, 2024

(65) Prior Publication Data

US 2026/0063501 A1 Mar. 5, 2026

(51) Int. Cl.
*G01M 3/38* (2006.01)
*G01M 3/04* (2006.01)

(52) U.S. Cl.
CPC ................ *G01M 3/38* (2013.01); *G01M 3/04* (2013.01)

(58) Field of Classification Search
CPC ................................. G01M 3/04; G01M 3/38
See application file for complete search history.

(56) References Cited

U.S. PATENT DOCUMENTS

| | | | | |
|---|---|---|---|---|
| 7,227,139 | B2 * | 6/2007 | Kram | G01M 3/38 250/301 |
| 8,927,924 | B2 * | 1/2015 | McStay | G01M 3/20 250/259 |
| 2007/0065162 | A1 | 3/2007 | Kikuchi et al. | |
| 2019/0162650 | A1 * | 5/2019 | Vallis | G01N 21/8422 |
| 2022/0291072 | A1 * | 9/2022 | Stumpf | H05K 7/20272 |
| 2023/0057800 | A1 * | 2/2023 | Tsai | G01J 3/42 |
| 2026/0063502 | A1 * | 3/2026 | Farkas | G01M 3/16 |

* cited by examiner

*Primary Examiner* — Nguyen Q. Ha
(74) *Attorney, Agent, or Firm* — Larson Newman, LLP

(57) ABSTRACT

An optical detector for detecting a coolant leak within an information handling system includes a light source, light sensor, and controller. The light source is configured to illuminate objects within the information handling system with a pattern of light. The pattern is determined according to a randomized encoding. The light sensor is configured to generate a signal in response to absorbing light emitted from an object illuminated by the light source. The signal is encoded according to the randomized encoding. A controller operatively coupled with the light sensor is configured to generate a decoded signal by reversing the randomized encoding of the signal. The controller is configured to identify a potential coolant leak in response to the decoded signal matching a predetermined pattern that indicates a coolant leak.

20 Claims, 5 Drawing Sheets

| bits | SS | ESS |
|---|---|---|
| 00 | * (+1) *(100%) | * (+1) *(100%) |
| 01 | n/a | * (+1) *(50%) |
| 10 | * (-1) *(100%) | * (-1) *(100%) |
| 11 | n/a | * (-1) *(50%) |

SECURE OPTICAL LEAK SENSING

FIELD OF THE DISCLOSURE

The present disclosure generally relates to information handling systems, and more particularly relates to optical detection of a coolant leak in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An optical detector for detecting a coolant leak within an information handling system includes a light source, light sensor, and controller. The light source is configured to illuminate objects within the information handling system with a pattern of light. The pattern is determined according to a randomized encoding. The light sensor is configured to generate a signal in response to absorbing light emitted from an object illuminated by the light source. The signal is encoded according to the randomized encoding. A controller operatively coupled with the light sensor is configured to generate a decoded signal by reversing the randomized encoding of the signal. The controller is configured to identify a potential coolant leak in response to the decoded signal matching a predetermined pattern that indicates a coolant leak.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
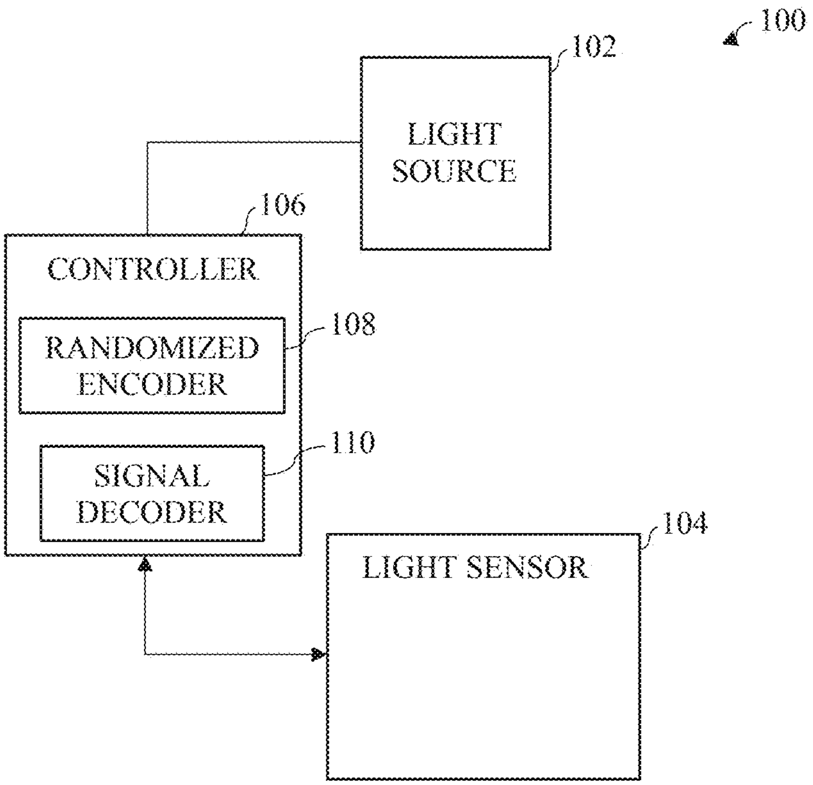
FIG. 1 is a block diagram of an optical detector according to an embodiment of the present disclosure.

FIG. 1 illustrates optical detector 100, according to an embodiment of the present disclosure. Optical detector 100 illustratively includes light source 102, light sensor 104, and controller 106. Light sensor 104 is configured to illuminate objects such as circuitry components or a collection of liquid coolant leaked within the chassis of an information handling system. In certain embodiments, light source 102 is formed with one or more light emitting diodes (LEDs) that illuminate objects with visible or non-visible (e.g., ultraviolet) light. Light sensor 104 is configured to detect an object such as leaked coolant in response to absorbing light reflected from the object. The light is reflected in response to object being illuminated by light source 102. In certain embodiments, light sensor 104 is a photodetector made up of an array of color-sensing photodiodes. Controller 106, in certain embodiments, is a microcontroller unit (MCU) communicatively coupled with light source 102 and light sensor 104.

Optical detector 100, in certain arrangements, may be integrated into the mainboard of an information handling system. In other arrangements, optical detector 100 may be a stand-alone device that connects internally to an information handling system, for example by connecting to an internal partition, side region, cover, or other part of the information handling system. Optical detector 100 is configured to detect a potential coolant leak from a liquid cooling apparatus or subsystem used to cool an information handling system.

For purposes of this disclosure, an information handling system is one that includes a liquid cooling apparatus or sub-system and that also can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, such an information handling system may be a personal computer (such as a desktop or laptop), server (such as a blade server or rack server), a network storage device, or any other suitable device and may vary in size, shape, performance, functionality, and price. The information handling system may include random-access memory (RAM), one or more processing resources such as a central processing unit (CPU), graphics processing unit (GPU), hardware and/or software control logic, as well as read-only memory (ROM) and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

As the processing power of information handling systems continues to increase, the use of liquid cooling is expected to become more common owing to certain advantages that liquid cooling offers over other types of cooling. Notwithstanding the advantages of liquid cooling, however, there is the possibility that one or more components of the liquid cooling system may develop leaks over time due to vibration, thermal cycles, aging, misalignment of heat exchangers and cold plates, or the like. Any leak that exposes the components of the information handling system to liquid can cause corrosion or damage to the circuitry within the system's housing. In certain arrangements, a leak occurring in one information handling system also may damage one or more nearby information handling systems if the systems are sufficiently close to one another. For example, a leak may occur in one of multiple servers stacked on a vertical rack (an increasingly common configuration). If the leak is not detected early enough, the coolant may spill out of one server and adversely affect one or more servers below it on the vertical rack.

Operatively, optical detector 100 monitors for potential coolant leaks within an information handling system by initially illuminating one or more objects in a specific area within the system's housing. An illuminated object may be a collection of liquid coolant that has leaked out of the cooling apparatus or subsystem of the information handling system. Light reflected from an object illuminated by light source 102 is absorbed by light sensor 104.

In certain embodiments, controller 106 activates light source 102 to emit pulses of light in a predetermined pattern. The pulse pattern may have a particular frequency, may have a particular duty cycle, or may be more complex. The light may be nonvisible ultraviolet (UV) light or light within the visible portion of the electromagnetic (EM) spectrum. Light reflected from an object illuminated by light source 102 is absorbed by light sensor 104. Controller 106, in certain embodiments, distinguishes light reflected from a collection of liquid coolant from other sources of light based on a particular pulse pattern.

For example, the liquid coolant may be infused with a dye that fluoresces with the pattern of the light emitted by light source 102. In this instance, "reflected" light from the object (liquid coolant) is the result of the dye's fluorescence. The fluorescence is emitted light having a longer wavelength and whose characteristics are determined by the intensity, duration, and frequency of the UV light pulses. The emitted light is absorbed by light sensor 104. The pattern of emitted light absorbed light sensor 104 is dictated by the pulse pattern of light emitted by light source 102. Controller 106 determines whether a potential coolant leak has occurred based on whether the pattern of light absorbed by light sensor 104 matches a predetermined pattern indicating a coolant leak.

In other arrangements, the coolant may respond to illumination by light source 102 using light other than UV light. Objects illuminated by light source 102 will reflect light having characteristics that when absorbed by light sensor 104 have measurable characteristics that controller 106 may utilized to determine whether a potential coolant leak has occurred.

While the arrangement provides an efficient mechanism for detecting a leak of coolant from a cooling apparatus or subsystem within the chassis of an information handling system, it nonetheless poses a danger. The danger is that the match between the predetermined pattern and that of the light absorbed by light sensor 104 is not due to an actual coolant leak. That is, the match between the pattern of absorbed light and the predetermined pattern is a false positive. A false positive may cause the shutdown of an information handling system suspected of having experienced a coolant leak. The shutdown can be costly in any number of ways and should be avoided unless truly necessary. A false positive may stem from the light sensor 104 absorbing light matching the predetermined pattern but emitted by a source external to the information handling system, such as a nearby server on a server rack or one within a data center that houses multiple information handling systems. Another possibility is that the false positive is intentionally induced. For example, someone may illicitly enter a data center and maliciously cause light sensor 104 to absorb a pattern of light that matches the predetermined pattern to intentionally cause a costly shutdown of an information handling system.

Referring still to FIG. 1, optical detector 100 is configured to mitigate the likelihood of a false positive. Randomized encoder 108 is configured to generate a randomized encoding of transmitted patterns of light for illuminating an object by light source 102. The randomized encoding operates to dictate characteristics of the pattern. Characteristics may include bit timing, which is randomized such that the timing is unpredictable, and/or sample amplitudes, which also may vary randomly according to the randomized encoding. Light sensor 104 is configured to absorb light emitted by the object illuminated by light source 102 and to convert the absorbed light into a signal (i.e., electrical response signal) encoded according to the randomized encoding of the pattern of light transmitted by light source 102. Decoder 110 is configured to decode the encoded signal by reversing the randomized encoding. A signal having a sinusoidal waveform, for example, may be converted into a pulse train or sequence of signal samples. Each pulse corresponds to a "bit" of information, the bit "timing" corresponding to the underlying signal sampled. Randomized encoder 108 in some embodiments encodes the information by randomly adjusting the bit timing, as described below. In other embodiments also described below, randomized encoder 108 adjusts the sample amplitudes and/or bit-reverses the waveform. Thus, the randomized encoding by randomized encoder 108, in accordance with different embodiments, may adjust a bit timing and/or sample amplitude of the signals. If a decoded signal matches a predetermined pattern, controller 106 is configured to determine that a potential coolant leak within the information handling system has occurred.

During operation of optical detector 100 monitoring for a coolant leak, an attacker may see a light flicker but cannot predict the next bit width or amplitude necessary for mimicking a waveform that triggers a false positive. The risk that a shutdown is initiated because light sensor 104 "sees" an alarm-indicating light pattern from a nearby module is likewise mitigated, as is a playback attack. In each instance, an extraneously or maliciously generated waveform is identified by controller 106 as a large signal with high-error rates (e.g., as discrete Fourier transform noise) and discarded.

Figure 2:
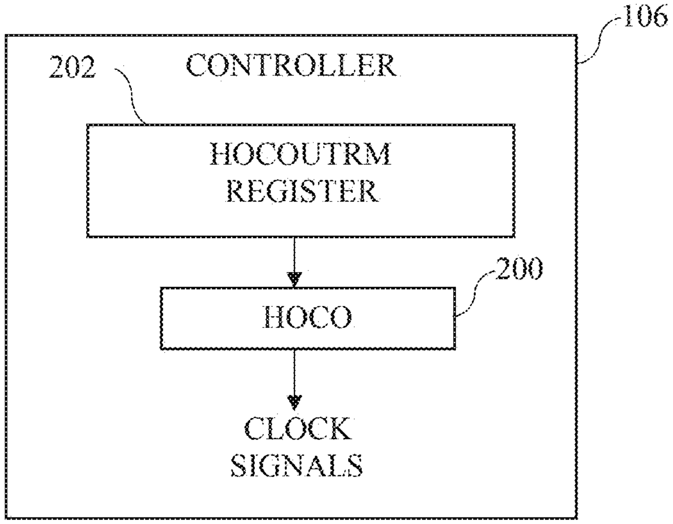
FIG. 2 is a controller implemented in a microcontroller unit of the optical detector of FIG. 1.

FIG. 2 illustrates certain embodiments in which controller 106 is implemented in a microcontroller unit (MCU) having clock signals generated by high-speed, on-chip oscillator (HOCO) 200. HOCOUTRM register 202 can control HOCO 200 to adjust the clock frequency of the MCU. The arrangement can dictate the encoding that is performed by randomized encoder 108. The encoding may include spread spectrum encoding using, for example, a seven-bit pseudorandom noise (PN) sequence that results in the pulses having relatively short cycle lengths (128 samples per period). Using HOCOUTRM register 202 to adjust the clock frequency effectively implements frequency hopping such that the duration of each bit per cycle is different and that any PN sequences used in adjacent information handling systems do not significantly overlap.

The random number for frequency modulation may be generated by XORing the lowest eight least significant bits (LSBs) of a reading from RGB channels of light sensor 104 implemented as a photodetector. Optionally, one or more bits may be bit reversed before XORing, the reversal corresponding to an optical noise floor that may vary from device to device and/or over time.

HOCOUTRM register 202 may be updated while waiting for color sensor conversion, providing extra time for the clock to stabilize. A frequency hop may be executed once for each PN bit.

Light source 102, in certain embodiments, illuminates objects within an information handling system with a pattern of light in which the pattern is a sequence of pulses determined according to a randomized encoding. The randomized encoding is generated by the MCU's frequency modulating the clock of the MCU using a random number that is generated as described above. The modulation effectively implements frequency hopping causing the time interval between successive pulses to vary randomly.

As noted above, encoding based on frequency hopping mitigates the risk of a false positive being induced by extraneous light from a nearby device (e.g., neighboring server) or an attacker attempting to cause a shutdown. It likewise reduces the risk of a successful playback attack because frequency hopping ensures that the timing of each bit is different. Thus, it is impossible to predict the timing of the next bit and create a correlated optical waveform to induce a false positive.

Figure 3:
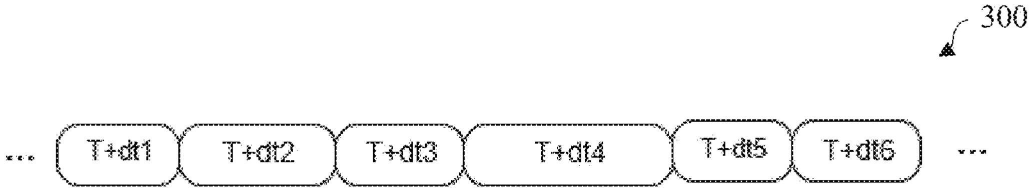
FIG. 3 illustrates randomized bit-time hopping implemented according to an embodiment of the present disclosure.

In certain other embodiments, as illustrated in FIG. 3, randomized encoder 108 encodes the pulses generated by bit-time hopping, modulating the duration of each bit with a bit-specific discrete time adjustment. Each bit-specific discrete time adjustment is randomly generated for stretching the duration of each of a sequence of bits 300. As shown, the time duration Teach of the sequence of bits 300 is adjusted by a bit-specific discrete time adjustment $dt_i$, i=1, 2, . . . , N. In some embodiments, the random number dictating the bit-specific discrete time adjustments $dt_i$ can be generated by XORing the lowest eight LSBs of a reading from RGB channels of light sensor 104 implemented as a photodetector. One or more bits may be bit reversed before the XORing, again, corresponding to an optical noise floor that may vary from device to device and/or over time. In other embodiments, each bit-specific discrete time adjustment $dt_i$ can be generated using a built-in random number generator of controller 106. The random number can be generated using a linear feedback shift register seeded by uptime. The random number is used to generate a bit-specific discrete time adjustment $dt_i$ after each color conversion of photodetector 104, making the bit timing unpredictable to an observer.

Accordingly, when the pattern of light illuminating objects within the information handling system is a sequence of pulses, the duration of each pulse varies randomly.

Figure 4:
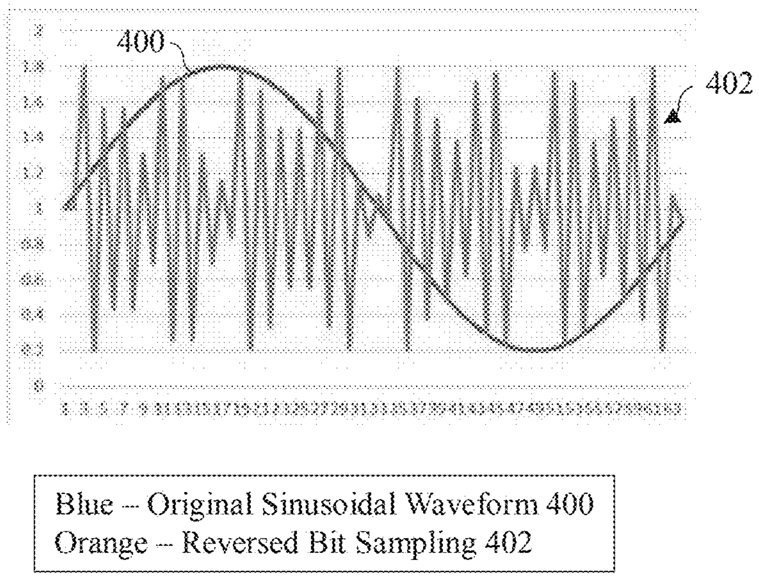
FIG. 4 illustrates randomized bit reversals implemented according to an embodiment of the present disclosure.

FIG. 4 illustrates a bit-reversal encoding of a signal that randomized encoder 108 is configured to perform according to an embodiment of the present disclosure. Illustratively, the signal has a sinusoidal waveform 400, corresponding to a spread spectrum sinusoidal waveform. Although a signal having sinusoidal waveform 400 may appear to be random noise, an intruder may detect the sinusoidal envelop of the signal. Randomized encoder 108 is configured to obscure the signal, making it difficult to induce a false positive with a signal having a waveform that duplicates sinusoidal waveform 400. Randomized encoder 108 is configured to randomize the variable by controlling steps in sampling sinusoidal waveform 400, and bit reversing it.

The bit-reversal encoding by randomized encoder 108 generates waveform 402, which resembles high frequency noise, or more precisely, appears as several modulated and shifted sine waves. The operability of decoder 110 is not affected. In certain embodiments, decoder 110 is configured to reverse the random encoding by performing a discrete Fourier transform (DFT). The DFT is not influenced by the order in which signal samples are summed and is compatible with a spread spectrum decoding process. Decoder 110 may also perform a DFT that bit-reverses a sine or cosine, effectively calculating the samples out of order without impacting the overall results for the full period of the signal.

Figure 5A:
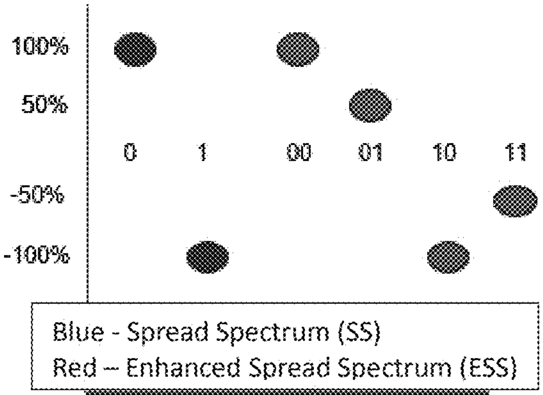
FIGS. 5A and 5B illustrate randomized bit amplitude modulation according to an embodiment of the present disclosure.
Figure 5B:
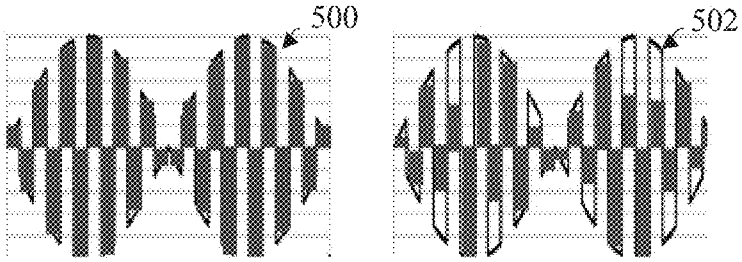

FIGS. 5A and 5B illustrate a randomized encoding based on signal amplitude modulation, which randomized encoder 108 is configured to perform according to another embodiment of the present disclosure. A signal having a sinusoidal waveform may be encoded with a spread-spectrum encoding generated with a pseudo-noise (PN) sequence. The PN sequence may be generated with a linear feedback shift register (LFSR), and randomized encoder 108 is configured to further encode the signal using additional PN bits from multiple LFSRs to modulate the signal's amplitude. The spread spectrum alone does not incorporate amplitude modulation. An enhanced spread spectrum encoding, however, dictates both signal polarity and amplitude modulation.

FIG. 5A illustrates a contrast between spread spectrum encoding and enhanced spread spectrum encoding. Illustratively, the spread spectrum uses a one-bit PN bit stream to control polarity and ensure that a wide spectrum remains wide. Enhanced spread spectrum encoding generated by randomized encoder 108 illustratively adds a second bit (generated from another LFSR) to generate a two-bit PN encoding stream that determines both polarity and amplitude modulation. More complex enhanced spread spectrum encoding schemes may be implemented using more than two LFSRs.

FIG. 5B illustrates the contrast between spread spectrum and enhanced spread spectrum. Waveform 500 is generated from a one-bit PN sequence 101010101010. Waveform 502 is encoded by randomized encoder 108 using enhanced spread spectrum encoding. The envelope of waveform 502 post-randomizing no longer resembles a sine wave. In this specific illustration, the enhanced spread spectrum encoding is generated by randomized encoder 108 using a two-bit PN sequence that determines polarity and modulates the amplitude of the signal, but as noted more complex encoding schemes can be generated with more than two LFSRs.

Figure 6:
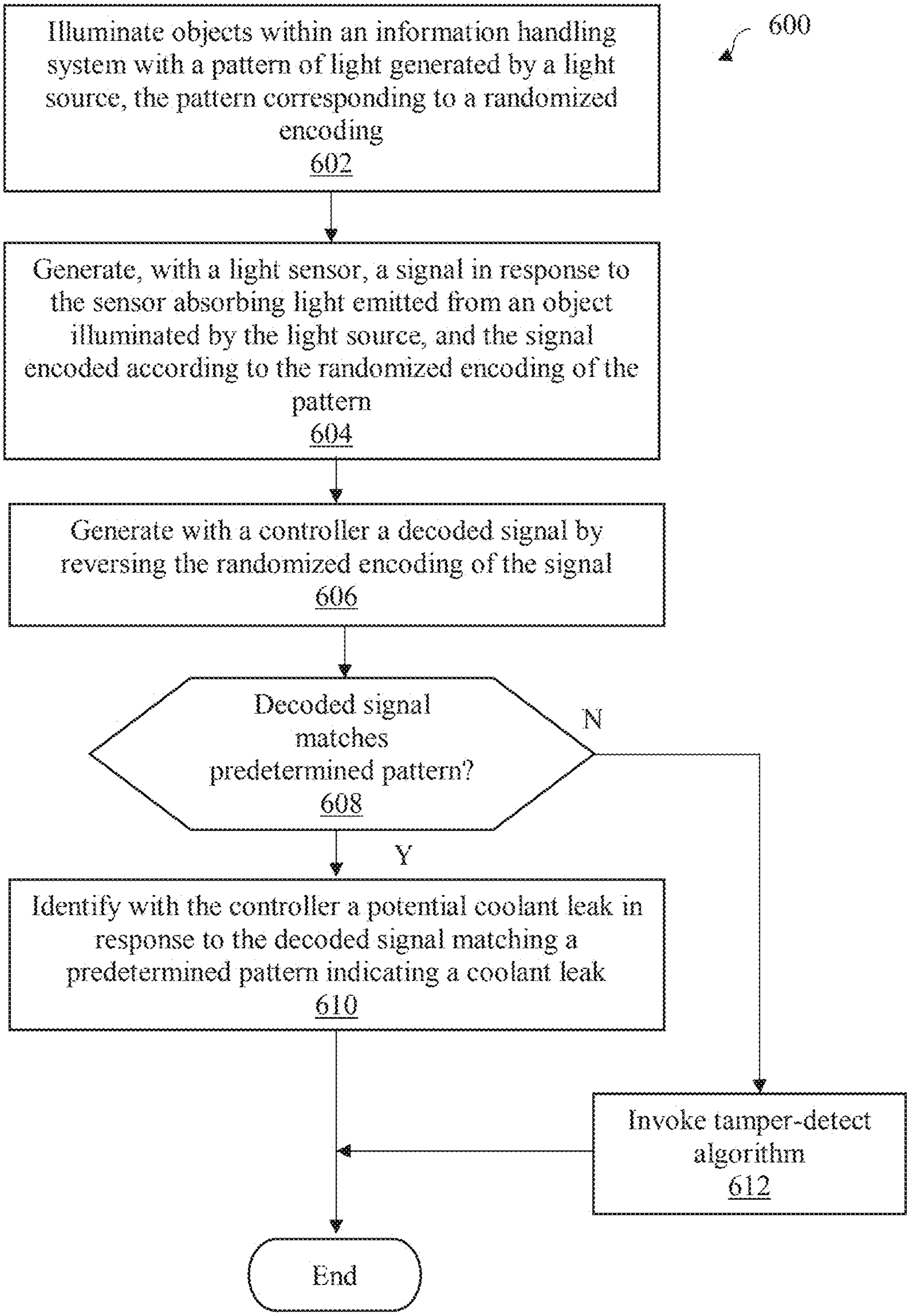
FIG. 6 is a flow diagram of a method for determining a potential coolant leak within an information handling system according to an embodiment of the present disclosure.

FIG. 6 is a flow diagram of method 600 for determining a potential coolant leak within an information handling system according to an embodiment of the present disclosure. It will be readily appreciated that not every method step set forth in this flow diagram is always necessary, and that certain steps of the methods may be combined, performed simultaneously, in a different order, or perhaps omitted altogether, without varying from the scope of the disclosure. Method 600 may be performed by an optical detector such as optical detector 100 described with reference to FIGS. 1-5.

At block 602, a light source of the optical detector illuminates objects within an information handling system. The light source illuminates the objects with a pattern of light. The pattern corresponds to a randomized encoding. At block 604, a light sensor of the optical detector generates a signal in response to absorbing light emitted from an object illuminated by the light source. The signal generated by the light sensor is encoded according to the randomized encoding. At block 606, a controller of the optical detector generates a decoded signal. The decoded signal is generated by the controller reversing the randomized encoding of the signal generated at block 604 by the light sensor. If at block 608 the controller determines that the decoded signal matches a predetermined pattern, the controller identifies a potential coolant leak at block 610. The controller can be configured to initiate an alarm by conveying a signal to an alarm system integrated in circuitry of, or positioned internally within, the information handling system. Alternatively, the alarm system may be at a remote site external to the information handling system. If the alarm system is located at a remote site, then in accordance with some embodiments, the controller may be configured with a transmitter to transmit the signal wirelessly, or alternatively, to convey the signal by a wireline connection with the alarm system.

If at block 608, the decoded signal does not match the predetermined pattern it may be due to attempt to invoke a false positive. Therefore, the controller may respond to a failure to determine a match by optionally invoking a tamper-detect algorithm to determine whether the signal generated by the light sensor was not in response to light emitted from an object illuminated by the light source but rather from an attempt to maliciously cause a shutdown of the information handling system.

In certain embodiments, the controller is an MCU that is configured to generate the randomized encoding. If the pattern of light is a sequence of pulses, then the pulses occur according to the randomized encoding. The randomized encoding, in some embodiments, determines a time interval between each pulse. The time interval between each pair of successive pulses varies randomly.

The randomized encoding, in certain embodiments is generated by the MCU frequency modulating a clock of the MCU. The frequency is modulated based on a random number. In some embodiments, the light sensor is a color sensor having a plurality of red-green-blue (RGB) channels, and the random number is generated by the MCU XORing bits of the RGB channels.

In some embodiments, in which the pattern of light comprises a sequence of pulses, the pulses occur according to the randomized encoding, and the randomized encoding determines the duration of each pulse. The duration of each pulse, in accordance with the randomized encoding, varies randomly.

Figure 7:
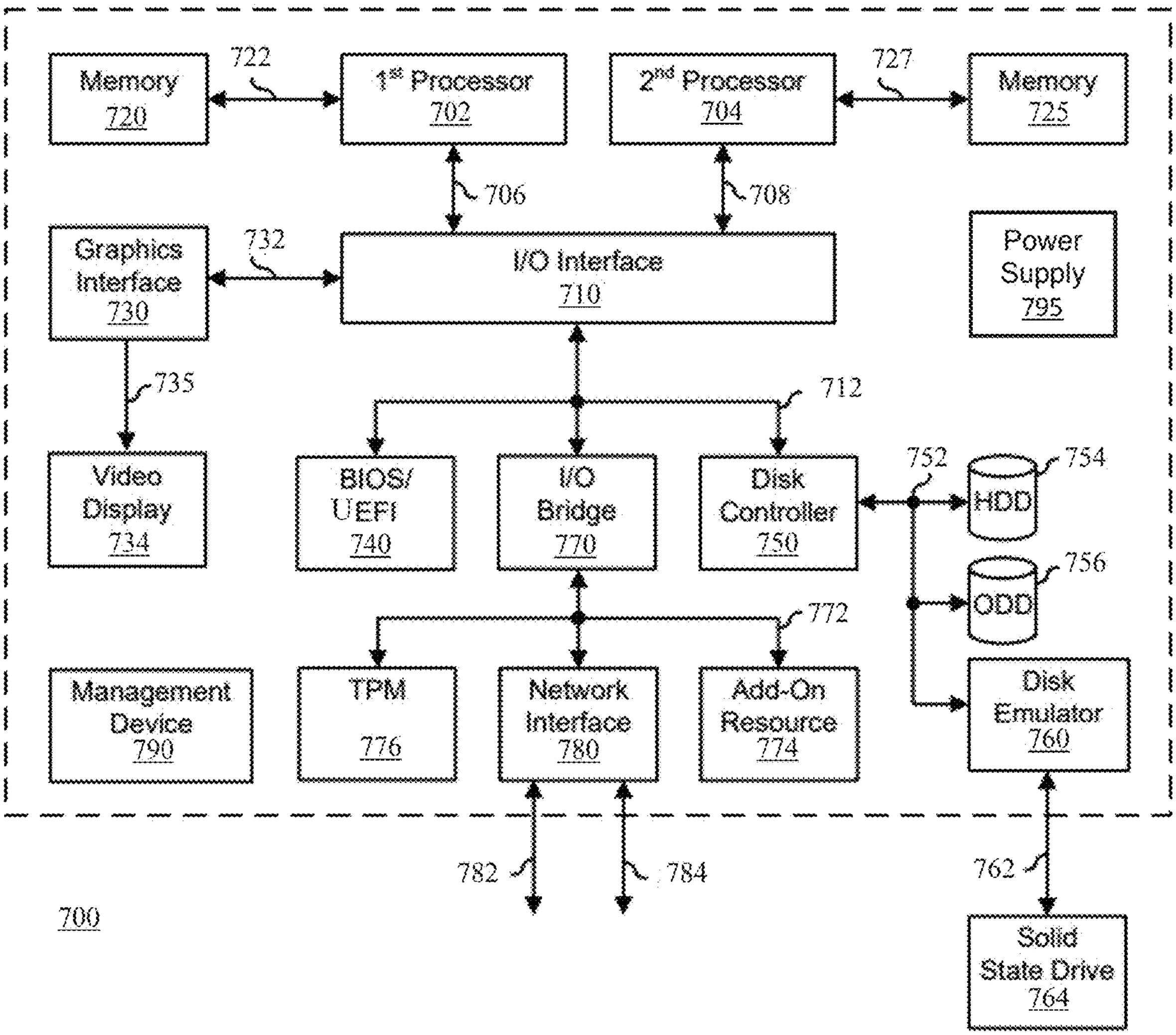
FIG. 7 is a block diagram of a general information handling system according to an embodiment of the present disclosure.

FIG. 7 shows a generalized embodiment of an information handling system 700 according to an embodiment of the present disclosure. Information handling system 700 may be an information handling system cooled by a liquid cooling apparatus or subsystem, which is monitored for leaks using an optical detector substantially similar optical detector 100 described in reference to FIGS. 1-5. For purpose of this disclosure an information handling system includes a liquid cooling apparatus or subsystem and can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 764, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 764, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 4394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off a separate power plane from the components of the host environment so that the management device receives power to manage information handling system 700 when the information handling system is otherwise shutdown. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

That which is claimed is:

1. An optical detector for detecting a coolant leak within an information handling system, the optical detector comprising:

a light source configured to illuminate objects within the information handling system with a pattern of light, wherein the pattern determined according to a randomized encoding;

a light sensor configured to generate a signal in response to absorbing light emitted from an object illuminated by the light source, wherein the signal is encoded according to the randomized encoding of the pattern; and a controller operatively coupled with the light sensor to generate a decoded signal by reversing the randomized encoding of the signal, and wherein the controller is configured to identify a potential coolant leak in response to the decoded signal matching a predetermined pattern indicating a coolant leak.

2. The optical detector of claim 1, wherein the controller is a microcontroller unit (MCU) configured to generate the randomized encoding, and wherein the pattern comprises a sequence of pulses occurring according to the randomized encoding.

3. The optical detector of claim 2, wherein the randomized encoding determines a time interval between each pulse.

4. The optical detector of claim 3, wherein the time interval between each pair of successive pulses varies randomly.

5. The optical detector of claim 2, wherein the MCU is configured to generate the randomized encoding by frequency modulating a clock of the MCU based on a random number.

6. The optical detector of claim 5, wherein the light sensor is a color sensor having a plurality of red-green-blue (RGB) channels and wherein the MCU is configured to generate the random number by XORing bits of the RGB channels.

7. The optical detector of claim 6, wherein the MCU is configured to bit-reverse one or more bits of the RGB channels prior to the XORing.

8. The optical detector of claim 1, wherein the controller is configured to generate the randomized encoding, wherein the pattern comprises a sequence of pulses occurring according to the randomized encoding, and wherein the randomized encoding determines a duration of each pulse.

9. The optical detector of claim 8, wherein the duration of each pulse varies randomly.

10. A method of detecting a coolant leak within an information handling system, the method comprising:

illuminating objects within the information handling system with a pattern of light generated by a light source, wherein the pattern corresponds to a randomized encoding;

generating with a light sensor a signal in response to the sensor absorbing light emitted from an object illuminated by the light source, wherein the signal is encoded according to the randomized encoding of the pattern;

generating with a controller a decoded signal, wherein the decoded signal is generated by reversing the randomized encoding of the signal; and identifying with the controller a potential coolant leak in response to the decoded signal matching a predetermined pattern indicating a coolant leak.

11. The method of claim 10, wherein the controller is a microcontroller unit (MCU) that is used to generate the randomized encoding, and wherein the pattern comprises a sequence of pulses occurring according to the randomized encoding.

12. The method of claim 11, wherein the randomized encoding determines a time interval between each pulse.

13. The method of claim 12, wherein the time interval between each pair of successive pulses varies randomly.

14. The method of claim 11, wherein the randomized encoding is generated by the MCU frequency modulating a clock of the MCU, and wherein the frequency modulating is based on a random number.

15. The method of claim 14, wherein the light sensor is a color sensor having a plurality of red-green-blue (RGB) channels and wherein the random number is generated by the MCU XORing bits of the RGB channels.

16. The method of claim 10, wherein the randomized encoding is generated by the controller, wherein the pattern comprises a sequence of pulses occurring according to the randomized encoding, and wherein the randomized encoding determines a duration of each pulse.

17. The method of claim 16, wherein the duration of each pulse varies randomly.

18. An information handling system, comprising:

a chassis;

at least one processor contained within the chassis;

a memory contained within the chassis;

a bus operatively coupling the memory with the at least one processor;

a liquid cooling subsystem configured to circulate a liquid coolant within the chassis; and an optical detector configured to detect a coolant leak, the optical detector including a light source configured to illuminate objects within the information handling system with a pattern of light, wherein the pattern corresponds to a randomized encoding;

a light sensor configured to generate a signal in response to absorbing light emitted from an object illuminated by the light source, wherein the signal is encoded according to the randomized encoding of the pattern; and a controller operatively coupled with the light sensor to generate a decoded signal by reversing the randomized encoding of the signal, and wherein the controller is configured to identify a potential coolant leak in response to the decoded signal matching a predetermined pattern indicating a coolant leak.

19. The information handling system of claim 18, wherein the pattern comprises a sequence of pulses occurring according to the randomized encoding, and wherein the randomized encoding determines a random time interval between each pulse.

20. The information handling system of claim 18, wherein the pattern comprises a sequence of pulses occurring according to the randomized encoding, and wherein the randomized encoding determines a random duration of each pulse.

* * * * *